United States Patent [19]
Pozzoli et al.

[11] Patent Number: 5,480,721
[45] Date of Patent: Jan. 2, 1996

[54] MULTILAYER STRUCTURES OF FLUORINATED AND NON-FLUORINATED THERMOPLASTIC POLYMERS

[75] Inventors: Massimo Pozzoli, Milan; Giandomenico Vita, Como, both of Italy; Larry L. Chapoy, Barrington Hills, Ill.

[73] Assignee: Ausimont, S.p.A., Milan, Italy

[21] Appl. No.: 303,385

[22] Filed: Sep. 9, 1994

[30] Foreign Application Priority Data

Sep. 9, 1993 [IT] Italy ................... MI93A1929
Jun. 9, 1994 [IT] Italy ................... MI94A1213

[51] Int. Cl.$^6$ ............ B32B 27/08; B32B 27/32; B32B 27/34; B32B 27/36
[52] U.S. Cl. ............ 428/422; 428/474.4; 428/474.7; 428/474.9; 428/475.5; 428/475.8; 428/476.3
[58] Field of Search ............ 428/474.4, 474.7, 428/474.9, 475.5, 475.8, 476.3, 422

[56] References Cited

U.S. PATENT DOCUMENTS

| | | | |
|---|---|---|---|
| 4,677,017 | 6/1987 | DeAntonis et al. | 428/214 |
| 5,139,878 | 8/1992 | Kim et al. | 428/421 |
| 5,328,948 | 7/1994 | Chen et al. | 524/101 |

FOREIGN PATENT DOCUMENTS

| | | |
|---|---|---|
| 040926 | 12/1981 | European Pat. Off. . |
| 132583 | 2/1985 | European Pat. Off. . |
| 450994 | 10/1991 | European Pat. Off. . |
| 523644 | 1/1993 | European Pat. Off. . |
| 2418810 | 9/1979 | France . |
| WO89/04348 | 5/1989 | WIPO . |
| WO93/03922 | 3/1993 | WIPO . |

OTHER PUBLICATIONS

Derwent Abstract of JP-A-57 135 844 (1982).
Derwent Abstract of JP-A-1051 459 (1989).
European Search Report for EP-A-94 113940.4.

*Primary Examiner*—Thomas Hamilton, III
*Attorney, Agent, or Firm*—Bryan Cave

[57] ABSTRACT

Multilayer structures comprising at least a fluorinated thermoplastic and a non-fluorinated thermoplastic wherein the adhesive intermediate layer comprises a fluorinated thermoplastic, a non-fluorinated thermoplastic and an ionomer which comprises copolymers having reactive groups salified or not; the amount of reactive groups in the ionomer copolymer being preferably higher than 3% by weight, in general between 8–35%.

18 Claims, No Drawings

MULTILAYER STRUCTURES OF FLUORINATED AND NON-FLUORINATED THERMOPLASTIC POLYMERS

The present invention relates to multilayers of thermoplastic materials, more particularly to thermoplastic fluorinated polymers coextrusion with thermoplastic polymers to obtain multilayer structures.

It is known in the art the coextrusion of numerous thermoplastic materials to form multilayer coextruded articles showing the advantages of the different properties of the various thermoplastic materials forming the multilayer.

The thermoplastic fluorinated polymers can be extruded or moulded to form extruded articles such as films, plates, pipes, cables or moulded articles in general, for their excellent chemical, electrical and barrier properties.

Nevertheless it is difficult to coextrude the fluorinated polymers to form multilayer extruded articles due to the difficulty of the fluorinated polymers to adhere to other non-fluorinated thermoplastic materials, The fluorinated thermoplastics are polymers showing an excellent chemical resistance, high barrier properties and electric insulation properties and due to these features are used in the chemical industry to stock and to transport chemical products and in the effluent treatment.

Nevertheless they show a lower mechanical resistance compared to the non-fluorinated thermoplastic polymers.

Therefore it was felt the need to prepare multylayer systems coupling fluorinatedand non-fluorinated thermoplastics no obtain a combination of the properties of both these materials.

The problem to solve is therefore to find a good adhesive which permits to obtain a good adhesion in the processing, moulding, extrusion of the fluorinated thermoplastics with non-fluorinated thermoprocessable polymers.

From the U.S. Pat. No. 4,677,017 it is known to prepare multilayer films comprising at least a layer of thermoplastic fluorinated polymer, selected among HALAR® (ethylene/chlorotrifluoroethylene copolymer), ETFE (ethylene/tetrafluoroethylene copolymer), tetrafluoroethylene/perfluoropropene copolymers (FEP), and at least a layer of a thermoplastic polymer selected from: polyamides, ethylene/vinylalcohol copolymers, wherein the adhesive is selected from ethylene/vinyl/acetate copolymers, olefin/esters copolymers, olefin copolymers containing carboxylic groups.

The Applicant has now found that these adhesives show adhesion at low temperatures but are less effective when they are used at very higher temperatures.

From EPA 523,644 it is known a plastic laminate having an aliphatic polyamide layer and a fluorinated resin layer using as adhesive middle layer a blend of an aliphatic polyamide with a fluorinated graft copolymer, the latter being obtained by grafting one or more fluorinated monomers on an elastomeric copolymer containing at least a fluorinated monomer and comprising also an unsaturated peroxidic compound. In this patent it is described how to obtain the grafting polymer which requires the preparation of the base copolymer and the subsequent monomer grafting by polymerization. The process of preparing the adhesive is complicated, and the final plastic laminate does not show a combination of satisfactory properties.

It is also known from patent WO 93/03922 to prepare multilayer films of a fluorinated copolymer with a thermoplastic polymer wherein, as adhesive layer, alkyl ester copolymers of an olefin with an ethylenically unsaturated alpha-beta carboxylic acid are used; or modified polyolefines comprising an olefin and a functional part, generally unsaturated carboxylic acids and anhydrides, or blends of the above said adhesives.

The multilayer film shows a high adhesion and good barrier properties.

It is an object of the present invention the preparation of multilayer structures having improved adhesion properties between fluorinated and non-fluorinated thermoplastics usable also at high temperatures, and combining excellent electrical, chemical resistance and barrier properties.

The solution of the above said problem has been obtained by using the adhesive described hereinbelow.

Object of the present invention are therefore multilayers structures comprising at least a fluorinated and a non-fluorinated thermoplastic wherein the adhesive middle layer comprises a blend comprising a fluorinated and a non-fluorinated thermoplastic and an ionomer or blends of more ionomers comprising copolymers having reactive groups which can be salified or not. The amount of the reactive groups is in general >3% by weight, preferably >10% by weight, more preferably higher than 20% by weight. Values of about 30–50% by weight can also be used.

As ionomer according to the present invention we mean also the blend of two or more ionomers of equal or different composition and amounts of reactive groups. The reactive group is preferably salified, in particular with zinc.

Examples of copolymers are those of an olefin with vinylacetate, an olefin with an ester, copolymers of olefins containing carboxylic groups, or mixtures of the above copolymers.

It has now surprisingly been found that the blend used in the present invention imparts an excellent mechanical resistance to the coextruded articles also at high temperatures, even higher than the melting temperature of the ionomer.

This result is fully unexpected and, without being bound to any theory, it seems to be due to the good dispersion of the ionomer during the blend preparation with the fluorinated and the non-fluorinated thermoplastic.

The adhesive blend of the present invention comprises, for 100 parts by volume from:

25% to 73% by volume of a non-fluorinated thermoplastic polymer;

73% to 25% by volume of a fluorinated thermoplastic; 2% to 40% by volume of the ionomer as above defined, the sum of the components being 100 by volume.

Preferably the non-fluorinated thermoplastic in the blend ranges from 30% to 65% by volume, more preferably from 40% to 45%; the fluorinated thermoplastic from 65% to 35% by volume, more preferably from 52% to 45%; the ionomer from 8% to 35% by volume, more preferably from 12% to 25%.

As suitable fluorinated polymer in the blend of the present invention we can cite for example ethylene/chloro-trifluoroethylene copolymers (HALAR®), tetrafluoroethylene/perfluoropropene copolymers, optionally comprising a third monomer, fluorinated olefin/perfluoroalkylvinylether copolymers (PFA, MFA), wherein the alkyl has 1 to 4 carbon atoms, ethylene/tetrafluoroethylene copolymers (ETFE), polychlorotrifluoroethylene, vinylidene fluoride (co)polymers or blends of the above said copolymers.

The cited fluorinated copolymers can contain also three or more monomers.

The preferred copolymers according to the present invention are HALAR®, ETFE, CTFE and PVDF.

As examples of non fluorinated thermoplastic polymers we can cite cellulosic polymers, polyamides as NYLON 6, NYLON 66, NYLON 11, NYLON 12, amide copolymers, polycarbonates, polyesters as for example polyethylentherefthalate, (co)polyesters; copolymers; polyolefins as for example high and low density polyethylene, olefinic copolymers, polyimides, polystyrene, polyurethanes, PVC, polysulphones, ethylene/vinylacetate copolymers, ABS.

The preferred non-fluorinated thermoplastic polymers are polyesters, polyolefins, polyamides.

The preferred copolymers used in ionomers are alkyl ester copolymers as for example copolymers of an olefin having from 2 to 12 carbon atoms and an alkyl ester of an unsaturated carboxylic acid. They are random, block or graft copolymers well known in the art. Examples of olefins are ethylene, propylene, pentene-1, hexene. The alkylic esters are methylacrylate, ethylacrylate, ethyl-butylacrylate, etc. Generally the alkylester quantity in the copolymers can vary preferably from 10% to 30% by weight, even if it can be comprised between 4% and 60% by weight. These copolymers can also be modified with 1–3% by weight of unsaturated carboxylic acids and their anhydrides, as for example maleic, crotonic, fumaric acid, maleic anhydride, etc.

Particularly preferred examples are copolymers, salified or not, of ethylene with acrylic acid, wherein the acrylic acid quantity is 3–15% by weight, preferably 5–10% by weight, ethylene/methylmethacrylate/acrylic acid polymers, wherein the functional groups quantity in the copolymer is 20–30% by weight.

These products are in commerce for example as IOTEK®, e.g., 4000, 7510, 7520. SURLYN®, e.g. 8120, PRIMACOR®.

It can be used also an ethylene/acrylic acid copolymer Na-salified, wherein the acrylic acid quantity is 15% by weight, in commerce as IOTEK® 8000.

The olefin copolymers comprise olefin monomers having from 2 to 8 carbon atoms, for example polyethylene, polypropylene and their copolymers. These copolymers can also be modified with polycarboxylic acids, or their anhydrides, as above said.

Generally the quantity of these acid modifiers is higher than 10% by weight, preferably higher than 20% by weight. The ionomer copolymers are obtained by processes well known in the art. The polyolefins can be modified also with vinylacetate.

Preferably the fluorinated and the non-fluorinated thermoplastic of the adhesive blend are of the same type of the corresponding fluorinated and non-fluorinated thermoplastics to be coupled.

Also thin thickness of the adhesive blend film, which generally varies from 150 to 600 microns, preferably from 300–500, is effective according to the present invention.

To obtain the adhesive blend one preferably operates as follows:

the granules of fluorinated thermoplastic, of non fluorinated thermoplastic and of the ionomer are put into a mixer in order to obtain an homogeneous blend.

Times from 30 minutes to 1 hour are generally sufficient for mixing.

The well dispersed blend of granules so obtained is sent into an extruder for obtaining just the real blend, the extruder temperature being at least higher than the melting temperature of the blend components.

A monoscrew, preferably biscrew, extruder can be used. The product outflowing from the extruder is the adhesive blend of the present invention.

The preferred details for obtaining the blend are reported in example 1.

The finished articles according to the present invention are structures with three or more layers usable as films, plates, pipes, cables or moulded articles in general.

The finished articles can be obtained either by moulding or by extrusion,

The adhesion test according no the present invention is made by compression moulding of a fluorinated thermoplastic plate, a non-fluorinated thermoplastic plate and a blend plate and successively by moulding by compression the two little plates of the thermoplastic polymers containing in the middle the adhesive plate.

The following examples are given with a mere indicative but not limitative purpose of the present invention.

EXAMPLE 1

An adhesive blend was made by dry mixing ganules of HALAR® 500=45% by volume, Polyamide 12 (UBE R-HV)=45% by volume, IOTEK® 7520=10% by volume (copolymer ethylene/methylacrylate-acrylic acid salified with zinc wherein the amount of functional groups is equal to 26% by weight).

The blend was extruded using a monoscrew extruder (Brabender) having a diameter of 18 mm and a L/D ratio= 24.

The temperatures set up by the hopper towards the head were the following: $T(1)=215°$ C., $T(2)=215°$ C., $T(3)=225°$ C., $T(4)=245°$ C., obtaining a temperature of the melt of $274°$ C.

The screw speed was see up at 50 rpm. A filter pack was used in order to improve mixing of the polymers before the head of the extruder, formed as follows: 60, 80, 100, 60 mesh.

Some plates having 100×50×1 mm sizes of HALAR®, polyamide 12 and a film of 0.5 mm of blend were separately molded by compression. For HALAR® and blend the molding temperature was 265° C. for 5 minutes, while the polyamide 12 plate was instead molded at the temperature of 220° C. for 5 minutes, after pre-drying the granules pre-dried in stove to remove moisture traces. In all cases the molding pressurees set up were between 10 and 30 bar.

The adhesion test was made inserting between the HALAR® and polyamide plate the blend film. The film has a length equal to 50% of the length of HALAR® and polyamide plates. In the remaining 50% an aluminium sheet is inserted in such a way so as to have, when molding is over, a surface part between the two layers which is not coupled and therefore to be able to carry out the final adhesion test according to ASTM D 1876 standard.

The threelayer system was inserted in a compression press and brought to the temperature of 255° C. for a time below two minutes. At this temperature all the components are above their melting temperature. The pressure exerted by the press plates was 20 bar. Cooling occurred by introducing the plates in a second press with the plates water cooled by forced circulation.

The result was very positive. The adhesive strength measured in two different conditions, gave the following results:
at test temperature of 23° C.
Strength/width=1.7N/mm, minimum value
Strength/width=6.3N/mm, maximum value
at test temperature of 120° C.
Strength/width =0.9N/mm, minimum value
Strength/width =1.7N/mm, maximum value.

The separation occurred partly between the blend and HALAR® and partly between the blend and the polyamide. In such case the adhesive strength depends also on the resistance to tensile stress of the blend as such. The blend film at the tensile strength test, according to ASTM D 1708 standard, gave a breaking load of 22 MPa and an elongation at break of 15%. The blend mechanical resistance can be increased when the blend is extruded with a biscrew extruder, more effective in the mixing than a normal monoscrew extruder.

EXAMPLE 2

An adhesive blend was made by dry mixing granules of HALAR® 500=45% by volume, Polyamide 12 (UBE R-HV)=45% by volume, PRIMACOR® 3440=10% by volume (copolymer ethylene/acrylic acid wherein the amount of comonomer acrylic acid is equal to 9% by weight)

The blend was extruded with the same modalities indicated in example 1.

Some plates having 100×50×1 mm sizes of HALAR®, polyamide 12 and a film of 0.5 mm of blend were separately molded by compression. For HALAR® and blend the molding temperature was 265° C. for 5 minutes, while the polyamide 12 plate was instead molded at the temperature of 220° C. for 5 minutes after the granules were pre-dried in stove to remove possible moisture traces. In all cases the molding pressurees set up were between 10 and 30 bar.

The adhesion test was made inserting between the HALAR® and polyamide plate the blend film. The film has a length equal to 50% of the length of HALAR® and polyamide plates. In the remaining 50% an aluminium sheet is inserted in such a way so as to have, when molding is over, a surface part between the two layers which is not coupled, and therefore to be able to carry out the final adhesion test according to ASTM D 1876 standard.

The threelayer system was inserted in a compression press and brought to the temperature of 255° C. for a time below two minutes. At this temperature all the components are above their melting temperature. The pressure exerted by the press plates was 20 bar Cooling occurred by introducing the plates in a second press with the plates water cooled by forced circulation.

The result was very positive. The adhesive strength measured at the temperature of 23° C., gave the following results:
Strength/width=0.55N/mm, minimum value
Strength/width=1.6N/mm, maximum value.

The separation occurred partly between the blend and HALAR® and partly between the blend and the polyamide. In such case the adhesive strength depends also on the tensile strength of the blend as such.

The blend film at the tensile strength test, according to ASTM D 1708 standard, gave a breaking load of 20 MPa and an elongation at break of 6%. The blend mechanical resistance can be increased when the blend is extruded with a biscrew extruder, more effective in the mixing than a normal monoscrew extruder.

EXAMPLE 3

An adhesive blend was made by dry mixing granules of PVDF, Polyamide 12 and IOTEK® 7520 in the following per cent conditions by volume;
PVDF (HYLAR® 460)=47%; Polyamide 12=43%; IOTEK® 7520 of example 1=10%.

The blend was extruded with the system described in example 1. The temperatures set up were the following: T(1)=200° C., T(2)=210° C., T(3)=220° C., T(4)=230° C., obtaining a temperature of the melt of 244° C. The screw speed was set up at 50 rpm. A filter pack was used in order to improve polymer mixing in the cylinder of the extruder formed as follows: 60, 80, 100, 60 mesh.

Some plates having 100×50×1.0 mm sizes of PVDF and polyamide 12; and a film of 0.5 mm of blend, were separately molded by compression. The PVDF, blend and polyamide plates were molded at the temperature of 220° C. for 5 minutes. In all cases the molding pressurees set up were comprised between 10 and 30 bar.

The adhesion test was carried out following the scheme of examples 1 and 2. The system, PVDF plate, blend film and polyamide plate, was inserted in the compression press and brought to the temperature of 230° C. for a time below 2 minutes. At this temperature all the components are above their melting temperature, the pressure exerted by the press plates was 20 bar. Cooling occurred by introducing the plates in a second press with the plates water cooled by forced circulation.

The result was positive. The adhesive strength measured at room temperature gave the following results:
Strength/width=2.1N/mm, minimum value
Strength/width=8.4N/mm, maximum value.

The separation occurred partly between the blend and PVDF and partly between the blend and the polyamide. In such case the adhesive strength depends also on the resistance to tensile stress of the blend as such.

The blend film at the tensile strength test, according to ASTM D 1708 standard, gave a breaking load of 27 MPa and an elongation at break of 30%. The blend mechanical resistance can be increased when the blend is extruded with a biscrew extruder, more effective in the mixing than a normal monoscrew extruder.

EXAMPLE 4

Example 1 was repeated but using a blend of adhesive by dry mixing granules of HALAR® 500=50% by volume, polyamide 12 (UB R-HV)=40% by volume, IOTEK® 7520=10% by volume.

The results obtained are the following: adhesive strength measured at the temperature of 23° C.:
Strength/width=1N/mm (minimum value)
Strength/width=1.8N/mm (maximum value).

The separation occurred between the blend and the polyamide.

EXAMPLE 5

A multilayer cable AWG 20 (Americam Wire Gauge) with internal copper wire having 1 mm diameter was made, a primary insulation of HALAR® having wall thickness of 0.25 mm, a middle layer in blend having wall thickness of 0.25 mm and an external coating in polyamide 12 having wall thickness of 0.25 mm.

The blend used was the same of example 1 and was obtained in the same conditions said above.

The cable was extruded in three phases by using for this purpose an extrusion line of Davis Electric with APV Sterling extruder having a diameter of 37 mm and a L/D ratio of 30 (length/diameter).

The primary insulation of the cable in HALAR® was obtained by setting up the following conditions: T1)=230° C., T(2)=260° C., T(3)=260° C., T(4)=280° C., T(5)=280° C., T(flange)=280° C., T(die casing)=290° C., T(die head)=300° C., so obtaining a temperature of the moulded mixture of 304° C., screw rate=10.5 RPM, line speed=200 m/min, pre-heating of the wire=150° C.

The HALAR® was extruded by using a tubolar die with DDR=100 (Drawn Down Ratio) and DRB=1 (Drawn Ratio Balance).

The adhesive layer constituted by blend ECTFE/PA12/ionomer was obtained by extruding the blend on the isolated cable in HALAR®, setting up the following conditions: T(1)=210° C., T(2)=240° C., T(3)=240° C., T(4)=250° C., T(5)=250° C., T(flange)=260° C., T(die casing)=260° C., T(die head)=270° C., so obtaining a temperature of the moulded mixture of 275° C., screw rate of 15 rpm, line speed of 60 m/min, the isolated cable in the HALAR®, before entering into the extruder head, was pre-heated by a suitable flame system to a temperature near to 220° C. in order to have a better adhesion to the blend.

The blend was extruded by a die so to obtain DDR=20 and DRB=1.

The external insulation of the cable with the polyamide 12 was obtained by extruding the polyamide on the cable coated with the HALAR® and the blend, setting up the following conditions: T(1)=180° C., T(2)=200° C., T(3)=220° C., T(4)=230° C., T(5)=230° C., T(flange)=235° C., T(die casing)=240° C., T(die head)=260° C., so obtaining a temperature of the moulded mixture of 265° C., screw rate of 30 rpm, line speed of 45 m/min, the isolated cable of the HALAR® and blend, before entering into the extruder head, was pre-heated by a suitable flame system at a temperature near to 220° C. so to have a better adhesion of the polyamide to the blend.

The polyamide was extruded by using a tubolar die so obtaining DDR=20 and DRB=1.

The adhesion between external insulation of polyamide and internal insulation of HALAR® was made by carrying out a traction test on the cable.

A cable end, where the blend and the external coating were manually removed, was clamped, the other end of the cable was passed through a hole, in the middle of a metallic plate having a diameter equal to the diameter of the cable constituted by metallic wire and insulation in HALAR® so that during the traction the external polyamide coating can be removed.

The part of the cable, where the external polyamide coating can be separated from the primary insulation in HALAR®, has a length of 25 mm.

Such a test is similar to the strip force test according to ASTM D 3032 through which it is measured the adhesion strength between conductive wire and the insulation part of a cable.

As above said, in our test, the wire was clamped with the primary coating in the HALAR®, instead of clamping only the metallic wire.

Also with a strength of 250N, no coating separation occurred.

This value shows that the blend acted very well as adhesive between the fluorinated polymer and the thermoplastic polymer layers.

EXAMPLE 6 (Comparison)

Example 1 was repeated but using as adhesive blend only the ionomer.

Some plates having 100×50×1 mm sizes of HALAR, polyamide 12 and a film of 0.5 mm of blend were separately molded by compression. For HALAR the molding temperature was 265° C. for 5 minutes, for the blend the molding temperature was 200° C. for 5 minutes, while the polyamide 12 plate was molded at the temperature of 220° C. for 5 minutes; the granules were pre-dried in stove to remove possible moisture traces. The molding pressures set up were between 10 and 30 bar.

The adhesion test was made inserting between the HALAR and polyamide plate the blend film. The film has a length equal to 50% of the length of HALAR and polyamide plates. In the remaining 50% an aluminium sheet is inserted in such a way so as to have, when molding is over, a surface part between the two layers which is not coupled and therefore to be able to carry out the final adhesion test according to ASTM D 1876 standard.

The three layer system was inserted in a compression press and brought to the temperature of 255° C. for a time below two minutes. At this temperature all the components are above their melting temperature. The pressure exerted by the press plates was 20 bar. Cooling occurred by introducing the plates in a second press and the plates were water cooled by forced circulation.

The result was negative and the separation occurred both between blend and HALAR and between blend and polyamide, even applying a very low separation force.

We claim:

1. Multilayer structures comprising at least a fluorinated thermoplastic polymer, a non-fluorinated thermoplastic polymer, and an adhesive intermediate layer, wherein the adhesive intermediate layer comprises a blend which comprises a fluorinated thermoplastic, a non-fluorinated thermoplastic and one or more ionomers comprising copolymers having reactive groups.

2. Multilayer structures according to claim 1, wherein the amount of reactive groups in the ionomer copolymer is greater than 3% by weight.

3. Multilayer structures according to claim 1, wherein the ionomer copolymer is selected from the group consisting of olefin/vinylacetate copolymers, olefin/ester copolymers, and polyolefins containing functional groups.

4. Multilayer structures according to claim 1, wherein the blend used as adhesive for 100 parts by volume comprises from:

25% to 73% by volume of a non-fluorinated thermoplastic polymer;

73% to 25% by volume of a fluorinated thermoplastic;

2% to 40% by volume of the ionomer as above defined;

the sum of the components being 100 by volume.

5. Multilayer structures according to claim 4, wherein the blend utilized as adhesive for 100 parts by volume comprises:

from 30 to 65% by volume of a non fluorinated thermoplastic polymer;

from 65 to 35% by volume of a fluorinated thermoplastic;

from 8 to 35% by volume of the ionomer as defined above.

6. Multilayer structures according to claim 5, wherein the non fluorinated thermoplastic varies from 40 to 45%; the fluorinated thermoplastic from 52 to 45%; the ionomer from 12 to 25%.

7. Multilayer structures according to claim 1, wherein the fluorinated thermoplastic is selected from the group consisting of ethylene/chlorotrifluoroethylene copolymers, tetrafluoroethylene/perfluoropropene copolymers, copolymers comprising tetrafluoroethylene, perfluoropropene and a third monomer, fluorinated olefin/perfluoroalkylvinylether copolymers, ethylene/tetrafluoroethylene copolymers, polychlorotrifluoroethylene, vinylidene fluoride copolymers, vinylidene fluoride polymers, and mixtures thereof.

8. Multilayer structures according to claim 7 wherein the fluorinated thermoplastic is an ethylene/chlorotrifluoroethylene copolymer.

9. Multilayer structures according to claim 1, wherein the non-fluorinated thermoplastic polymer is selected from the group consisting of cellulosic polymers, polyamides, polyamidic copolymers, polycarbonates, polyesters, polyolefins, olefinic copolymers, polyimides, polystyrenes, polyurethanes, PVC, polysulphones, ethylene/vinylacetate copolymers, and ABS.

10. Multilayer structures according to claim 9, wherein the non-fluorinated thermoplastic polymer is selected from the group consisting of polyesters, polyolefins, and, polyamides.

11. Multilayer structures according to claim 1, wherein the copolymers used as ionomers are copolymers of an olefin having from 2 to 12 carbon atoms and an unsaturated carboxylic acid.

12. Multilayer structures according to claim 1, wherein the fluorinated thermoplastic and the non-fluorinated thermoplastic in the adhesive intermediate layer are of the same type as the fluorinated thermoplastic and non-fluorinated thermoplastic to be coupled.

13. Films, plates, pipes, cables, molded articles made from the multilayer structures according to claim 1.

14. Multilayer structures of claim 1 obtained by coextrusion and by molding.

15. Multilayer structures according to claim 11, wherein the copolymers used as ionomers further comprise an alkyl(meth)acrylate.

16. Adhesive blends comprising from:

25% to 73% by volume of a non-fluorinated thermoplastic polymer;

73% to 25% by volume of a fluorinated thermoplastic polymer;

2% to 40% by volume of an ionomer;

the sum being 100 by volume.

17. Adhesive blends according to claim 16 comprising:

from 30 to 65% by volume of a non fluorinated thermoplastic polymer;

from 65 to 35% by volume of a fluorinated thermoplastic;

from 8 to 35% by volume of the ionomer.

18. Adhesive blends according to claim 16 comprising:

from 40 to 45% by volume of a non fluorinated thermoplastic polymer;

from 52 to 45% by volume of a fluorinated thermoplastic;

from 12 to 25% by to volume of the ionomer.

* * * * *